United States Patent [19]

Jost et al.

[11] Patent Number: 4,662,960

[45] Date of Patent: May 5, 1987

[54] METHOD OF FRAMING SLIDES

[75] Inventors: Jochen Jost; Detlef Handschke, both of Essen, Fed. Rep. of Germany

[73] Assignee: Filmosto-Projektion Johannes Jost GmbH & Co., Essen, Fed. Rep. of Germany

[21] Appl. No.: 618,391

[22] PCT Filed: Oct. 4, 1983

[86] PCT No.: PCT/EP83/00258

§ 371 Date: Jun. 1, 1984

§ 102(e) Date: Jun. 1, 1984

[87] PCT Pub. No.: WO84/01441

PCT Pub. Date: Apr. 12, 1984

[30] Foreign Application Priority Data

Oct. 5, 1982 [DE] Fed. Rep. of Germany ....... 3236842

[51] Int. Cl.$^4$ .................................... B60J 1/00

[52] U.S. Cl. .................................. 156/108; 40/158 B; 156/391; 156/517; 156/521; 156/522

[58] Field of Search ............... 156/108, 152, 391, 517, 156/521, 522, 566, 580; 40/158 B

[56] References Cited

U.S. PATENT DOCUMENTS 2,725,155 11/1955 Fitch et al. ......................... 156/364
3,992,243 11/1976 Berggren et al. .................. 156/521
4,427,486 1/1984 Green et al. ....................... 156/517

FOREIGN PATENT DOCUMENTS 1918970 10/1970 Fed. Rep. of Germany .
2326724 4/1977 France .

*Primary Examiner*—Jay H. Woo
*Assistant Examiner*—Timothy W. Heitbrink
*Attorney, Agent, or Firm*—Spensley Horn Jubas & Lubitz

[57] ABSTRACT

The film (3) is introduced prior cutting in an open frame (1) arranged in a seizing position until the portion of film to be framed (3*a*) has reached its final position within the frame. Thereafter, the film portion is secured in its final position and then cut by an appropriate device arranged at the vicinity of the frame opening. The cutting device (5) is then removed by displacement with respect to the frame (1) held in a fixed position, the film portion is maintained within the frame and the latter is finally closed. Hence, the seizing devices are avoided; furthermore, the film portion (3*a*) is placed in its correct position within the frame (1). An auxiliary guiding device (8) removed from the film guide (4), arranged on the side opposite to the cutting device (5), provides for the positioning of the film portion, said portion should present the last image of the film without being guided in the guiding conduit (4).

10 Claims, 4 Drawing Figures

METHOD OF FRAMING SLIDES

The present invention relates to a method of and a device for mounting transparencies in split-frame transparency mounts or transparency mounts consisting of two frame parts.

Heretofore, if a known apparatus is used for mounting transparencies in transparency mounts, the film has been driven in guides by a conveying means, such as a roller having projections or a gripper, to be conveyed to a cutting means located in a predetermined position relative to said guides, said film has thereafter been cut view by view and each film portion so cut has been conveyed by a suction gripper or a mechanical gripper along a predetermined path to its final position in an open mount held in a holding device, as, for example, described and claimed in German Patent No. 19 18 970. Another known transparency mounting device provides for the film portion to be mounted to be driven into a frame or mount partly held open, to be cut from the film outside said frame or mount and to be moved into its final position in said mount or frame by a gripping means holding each film portion so cut through the window of said mount or frame. All known methods of and devices for mounting transparencies feature guides and cutting means attached thereto being in a predetermined position relative to the mounts or frames presented by a holding device. Such known transparency mounting devices and methods require, for the reliable transfer of the cut film portion from the cut position to the final position in the mount or transparency, the use of an additional gripping device forming an essential part of the apparatus for mounting transparencies and making the operation of feeding said cut film portion into the open mount or frame ready for framing a discontinuous operation undesirably slowing down the mounting process.

Moreover, conventional mechanical methods of and devices for mounting transparencies in transparency mounts heretofore known are unfit for handling short films and mounting the last view on such short films or require considerable manual intervention for such handling or mounting operations, the main reasons being that said last view cannot be held adequately by the guides guiding the film and cannot be moved by the conveying means of such conventional apparatus to a position suitable for said last view to be gripped by the gripping device provided.

The main object of the present invention is the provision of a novel method of and apparatus for mounting transparencies in transparency mounts allowing a reliable automatic transfer of each film view to be so mounted into its final position in said mount and holding said view therein without the use of a separate gripping device. It is another objective of the present invention to transfer each view to be mounted in each such transparency mount reliably to its final position in such mount or frame practically irrespective of the remaining length of the film being conveyed and fed by the guides provided. According to the present invention, a split-frame mount or a mount consisting of two frame parts is provided and kept open for mounting the transparency, the leading end of a developed film being moved into said open frame until the front view or front portion to be mounted has reached its final position in said mount or frame whereupon said view is fixed inside said frame. A cutting means is thereafter moved into said open mount or frame and said view being in its final position in said mount or frame is then cut from said film along a cutting line inside the open frame. The cutting means is thereafter moved out of the open frame or mount, the cut view being held inside said mount or frame, and the mount or frame is thereupon closed over said cut view still being in its final position inside said mount or frame.

The present invention hence abandons the conventional approach of known methods of and devices for mounting transparencies in transparency mounts whereby the position of the cutting device connected to the guides relative to the device holding the frames or mounts or the frames or mounts presented for mounting the cut views remains unchanged throughout the transparency mounting process. It is characteristic of the present invention to provide for a relative movement so that the film portion to be mounted has already reached its final position inside the transparency mount or frame when it is cut being inside the open frame thereby eliminating the need for a separate gripping device to transfer the cut film portion from the point where it was cut to its final position inside the mount or frame and to reliably move said film portion to be framed or mounted still connected with the remainder of the film to its final position in said mount or frame. The present invention also eliminates any contact between the view area of said film portion to be mounted and any gripping device or means thereby preventing any risk of scratches on said view typical of certain known gripping devices. According to the present invention, the entire process from feeding the entire film to the arrival of the film portion to be mounted or framed in its final position in the frame presented for mounting is continuous since said film portion will only be cut from the remainder of the film when it has reached said final position in said frame or mount thereby accelerating the speed of the framing or mounting process by comparison to the speed of known methods of mounting transparencies in transparency mounts.

For processing short lengths of film and framing the views thereof, including, without limitation, the very last view, the invention provides for keeping the film portion to be mounted at a minimum distance from the lower part of the transparency mount during the insertion of said film portion into the open frame beyond the cutting device. As the very last view of any film is moved beyond the cutting device or the cutting position, any guides and even comparatively narrow guides incorporated in the guides before the cutting device will lose their grip; according to the present invention, auxiliary guides located on the side facing the mount holding device referred to above will guide said view to its final position inside the mount or frame presented for mounting.

Prior to the removal of the cutting device from its cutting position in the open frame, the cut film portion needs to be fixed in the final position then reached to prevent any movement of said film portion due to any friction of said film portion with said auxiliary guide or any other means or device. In a preferred embodiment of the present invention, said fixation is achieved by the two mount or frame parts opposite the open end of said mount or frame being pressed together thereby fixing said film portion in its final position between said two parts.

The last portion of each film is preferably fed into the mount or frame being presented by pushing the trailing edge of said portion opposite said mount or frame. According to a preferred embodiment of the present invention wherein the device holding the mounts or frames and the mount or frame being presented are stationary, the guides, the conveying means and the cutting device are arranged on a mobile skid. Motion of said skid toward the mount or frame presented will allow the cutting edge of said cutting device to enter the open frame or mount presented sufficiently for the front end of the film portion to be cut to have reached its final position inside said mount or frame beyond the point of cutting. In another embodiment of the present invention, the method which is the subject of the present invention and the functions of the apparatus provided for by the present invention may be implemented by stationary guides, conveyor means and cutting device and a mobile frame or mount holding device moving to a predetermined cycle.

To move the film portion to be mounted or framed into its final position beyond the point where said film portion is cut by the cutting device inside the open mount or frame, another embodiment of the present invention provides for the film conveying means to be coupled with the cycle of relative movement between the guides and the cutting means of the one part and the frame or mount holding device of the other by way of a transmission mechanism incorporating gearing. Said transmission mechanism preferably features a free-run system engaging the conveying means in the direction of film feed and disengaging said means in the opposite direction thereby leaving the leading edge of the film held by the guides aligned in the cutting position when the cutting means is being removed from the open frame or mount.

The above and other objects, characteristics and features of the present invention will be more fully understood from the following description of an embodiment of the present invention taken in connection with the accompanying illustrative drawings.

Figure 2:
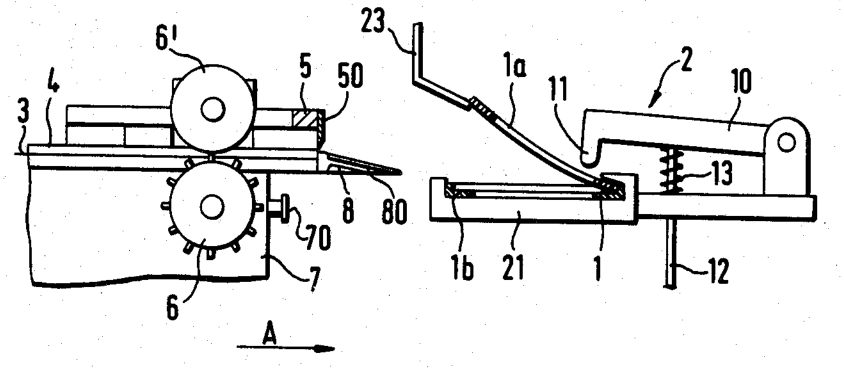
FIG. 2 is a schematic side view of the part of the transparency mounting apparatus represented by FIG. 1 upon the commencement of the transparency mounting operations.
Figure 3:
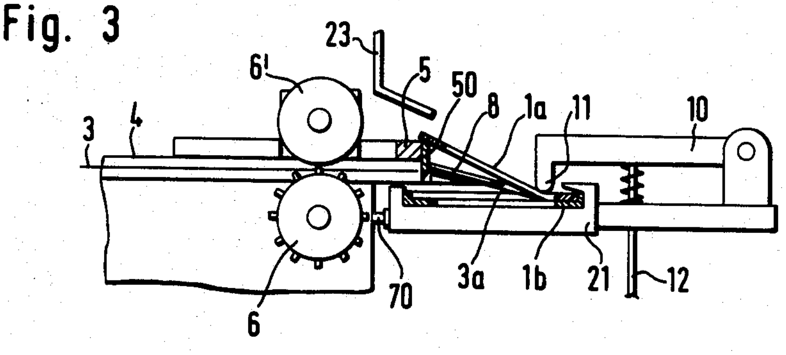
Figure 4:
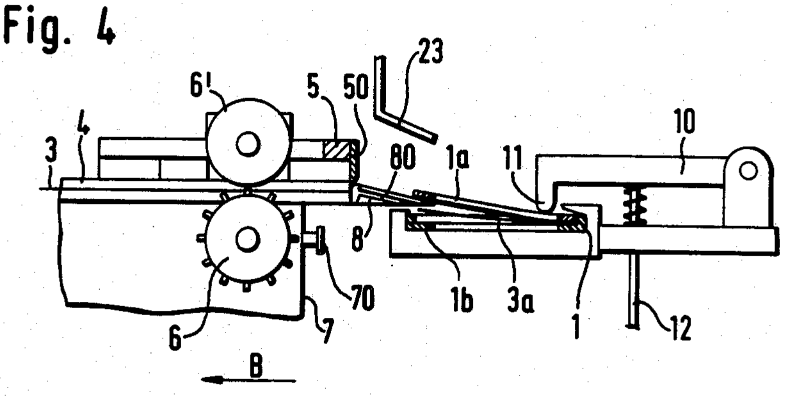

FIG. 3 shows a simplified view of the part of the transparency mounting apparatus shown by FIG. 2 at a later point in the transparency mounting process immediately after cutting the film portion to be mounted; and FIG. 4 shows a similar view as FIG. 3 at a still later point in the transparency mounting process when the cut film portion to be mounted has been fixed in its final position in the transparency mount or frame and the cutting device arranged on a skid together with the guides and the conveying means as well the remaining views of the film have been removed from the open frame or mount.

The drawings schematically illustrate the framing apparatus invented and the major components thereof. The frame 1 in which the transparency is to be mounted is presented in an open position by a stationary mount holding device generally designated by the reference numeral 2 (see FIG. 2). Said mount holding device comprises a mount holder 20 wherein the empty mounts are stacked, a mount track 21 for transferring said empty mounts to the loading station and opening said empty mounts and a mount discharge track 22 beyond said mount loading station for closing the mounts holding the views mounted and discharging said mounts from the transparency mounting device. The means used for moving said mounts on mount track 21 and mount discharge track 22 as well as the means for opening and closing said mounts are well known and thence not described herein. It is also known that a guide bar 23 may be used to hold the upper part 1*a* of a generally split mount at an edge at a certain distance from the lower part 1*b* of said mount being guided by track 21 thereby presenting mount 1 in a position ready for the insertion of a film portion to be mounted.

The film 3 is moved to mount 1 being presented at the loading station using guides 4. At the end of said guides 4, a blade 50 is held by a cutting device 5 designed for vertical movement. The movement of said film along the guides 4 is achieved by a roller 6 having projections engaging in perforations in said film, said film being thence driven by known methods.

It is a novel characteristic of the transparency mounting apparatus provided for by the present invention that the guides 4, the cutting device 5 and the roller conveying device 6 are arranged on a skid 7 moving relative to the mount holding device 2 in the direction of the movement of the film 3 as shown by the double-headed arrow H, said movement being limited by appropriate limit stops. Split auxiliary guides 8 are mounted on the very front end of said mobile skid 7, said auxiliary guides protruding in a nose-like manner beyond the blade 50 of the cutting device 5 at the end facing the mount 1 being presented by the mount holding device 2 so lending horizontal and vertical support beyond the guides 4 to a film portion 3*a* moved forward beyond the cutting device 5 in the direction of the mount 1. The functions of said auxiliary guides 8 chiefly important for the very last view of a film 3 are discussed below by reference to FIGS. 2 to 4.

The skid 7 further incorporates a pusher 9 moving across guides 4 behind the film 3 to push the last view of film 3 into its final position in the mount 1 said pusher moving on a rod 90 parallel to guides 4 and the direction of film movement H.

The novel characteristics and features of the transparency mounting method provided for by the present invention and the difference between said novel method and known methods are best understood from FIGS. 2 to 4 being schematic representations of three consecutive phases of the transparency mounting method hereby provided for.

FIG. 2 illustrating the commencement of a transparency mounting cycle shows mount 1 being presented at the transparency loading station in the C-shaped mount track 21, the upper mount part 1*a* being lifted by bar 23 from the lower mount part 1*b* at the end facing the skid 7, the upper mount part 1*a* and the lower mount part 1*b* forming a mouth-like opening.

The skid 7 carrying the guides 4, the cutting device 5, the conveying device 6 taking the form of a roller having projections and the nose-shaped auxiliary guides 8 is relatively distant from the mount holding device 2. The leading edge of film 3 from which a film portion 3*a* (see FIG. 3) is cut and thereafter mounted during each mounting cycle is aligned with the cutting line of blade 50 of the cutting device 5. The mount holding device 2 features a fixing device 10 to fix the view 3*a* moved into its final position in mount 1 and to partly close said mount 1. In the embodiment of the present invention illustrated by the drawing, said fixing device 10 incorporates two plunger members 11 provided to be lowered by a rod 12 applying a force in a direction opposite to the direction of the tension of a spring member 13. Upon the commencement of the transparency mounting cycle illustrated by FIG. 2, said fixing device 10 is inoperative and said plunger members 11 are lifted off the upper mount part 1*a* by the tension of said spring member 13.

To feed the film portion 3*a* to be mounted, the skid 7 is driven generally by a motor in the longitudinal direction of the film 3 represented by arrow A in FIG. 2, moving toward the mount holding device 2 and mount 1 presented, until the cutting line of blade 50 and the nose-shaped auxiliary guides 8 for the film portion 3*a* to be mounted enter mount 1 between the upper mount part 1*a* and the lower mount part 1*b*. The feed drive of skid 7 not shown by the illustration and the transmission mechanism of the roller conveying device 6 not illustrated, either, are coupled and/or synchronized so that film 3 will be moved forward by the full length of the film portion 3*a* to be mounted beyond the cutting line of blade 50 thereby entering the open mount 1, film portion 3*a* being guided beyond guides 4 and said cutting line into mount 1 by means of grooves 80 (see FIG. 1) of the split auxiliary guides 8. The roller 6 having projections engaging in perforations in the film for driving the film may either be driven simultaneously with the skid 7 in direction A by means of suitably adjusted gearing so that the full length of the film portion 3*a* to be mounted has moved beyond the cutting line of blade 50 into mount 1 when skid 7 has reached its front-end position that may be limited by an adjustable limit stop 70 or the like means or the drive of said roller 6 may be delayed with respect to the drive of skid 7 so that the forward movement of the film 3 and thence the forward movement of the film portion 3*a* to be mounted and the commencement of the movement of skid 7 do not coincide. To accelerate transparency mounting, the drive of skid 7 in the direction of arrow A and the drive of conveying device 6 to move the film 3 are synchronized so that the full length of the film portion 3*a* to be mounted protrudes from guides 4 at the time when the forward movement of skid 7 is limited by limit stop 70 hitting mount holding device 2 and the cutting device 5 on said skid 7 is in its cutting position in mount 1 shown and illustrated by FIG. 3.

As skid 7 approaches its final position illustrated by FIG. 3 and the film portion 3*a* to be mounted approaches its final position in mount 1, the fixing device 10 remains in its release position illustrated by FIG. 2 wherein the plunger members 11 remain lifted off the upper part 1*a* of mount 1, the leading edge of the front film portion 3*a* still part of film 3 hence sliding forward without any restriction to its final position in mount 1. As and when said final position is reached by the front film portion 3*a* to be mounted, but before blade 50 cuts said front portion 3*a* from film 3, a load is applied to rod 12 pushing the two plunger members 11 of the fixing device 10 downward on the upper part 1*a* of the mount 1 thereby fixing said leading edge of film portion 3*a* in its final position between the upper part 1*a* and the lower part 1*b* of mount 1. As the upper part 1*a* of mount 1 is so being pushed downward, its edge kept open by bar 23 slides off said bar pointing inward and is lowered on a component of the cutting device 5 or the auxiliary guides 8 penetrating into the opening of mount 1, thereby actuating the cutting device 5. The blade 50 thereafter cuts, along the cutting line, film portion 3*a* held in its final position between the upper part 1*a* and the lower part 1*b* of mount 1 by means of the plunger members 11 from the remainder of film 3, the cut film portion 3*a* hence already being fixed in its final position in mount 1 as it is being cut.

Following the separation of film portion 3*a* fixed in mount 1 from the remainder of film 3, the skid 7 is withdrawn from mount 1 in the direction of arrow B in FIG. 4, until the cutting device 5 and the nose-shaped auxiliary guides 8 have fully retracted from the opening of mount 1. FIG. 4 shows an intermediate position of the return of skid 7 into the initial position shown by FIG. 2.

As skid 7 so returns to its initial position, the film portion 3*a* in mount 1 continues to be held in place by the plunger members 11 being pushed on the upper part 1*a* of mount 1 by fixing device 10, thereby preventing said film portion 3*a* from being moved backward by the auxiliary guides 8, the slit for blade 50 or the like, as skid 7 and components 4, 5, 6 and 8 on said skid 7 are being retracted from mount 1. As skid 7 is being retracted, the edge of the upper part 1*a* of mount 1 facing skid 7 closes on the nose-shaped auxiliary guides 8 as a result of the pressure applied by the plunger members 11, closing mount 1 almost entirely, when the auxiliary guides 8 have been fully removed from the gap between the upper part 1*a* and the lower part 1*b* of mount 1. The plunger members 11 are thereafter released and the mount holding film portion 3*a* is thereafter transferred to the mount discharge track 22 for being shut completely by known mount closing means.

As skid 7 returns to its initial position as shown by arrow B, the roller conveying device 6 is inoperative so that film 3 guided by guides 4 is not retracted from its position of alignment with the cutting plane of blade 50. Such inoperability may be achieved by the incorporation of a free-running mechanism in the transmission mechanism for driving roller 6 representing said conveying device, thereby preventing the transmission of the retraction of skid 7 in the direction of arrow B to said roller 6. In one embodiment of the present invention, roller 6 may be driven by a Geneva motion system, as skid 7 moves in direction A, said driving mechanism being appropriately coupled with the drive of skid 7. In another embodiment of the present invention, conveying device 6 may be driven by a rack incorporated in skid 7 in the direction of film 3, said rack hitting a stop at a predetermined point of the skid movement and driving the roller 6 representing the conveying means by way of gearing until skid 7 has reached its forward position (see FIG. 3), the rack drive and the skid drive being coupled so that the film portion 3*a* to be mounted fully protrudes beyond the cutting plane of blade 50, as skid 7 reaches said final forward position.

Figure 1:
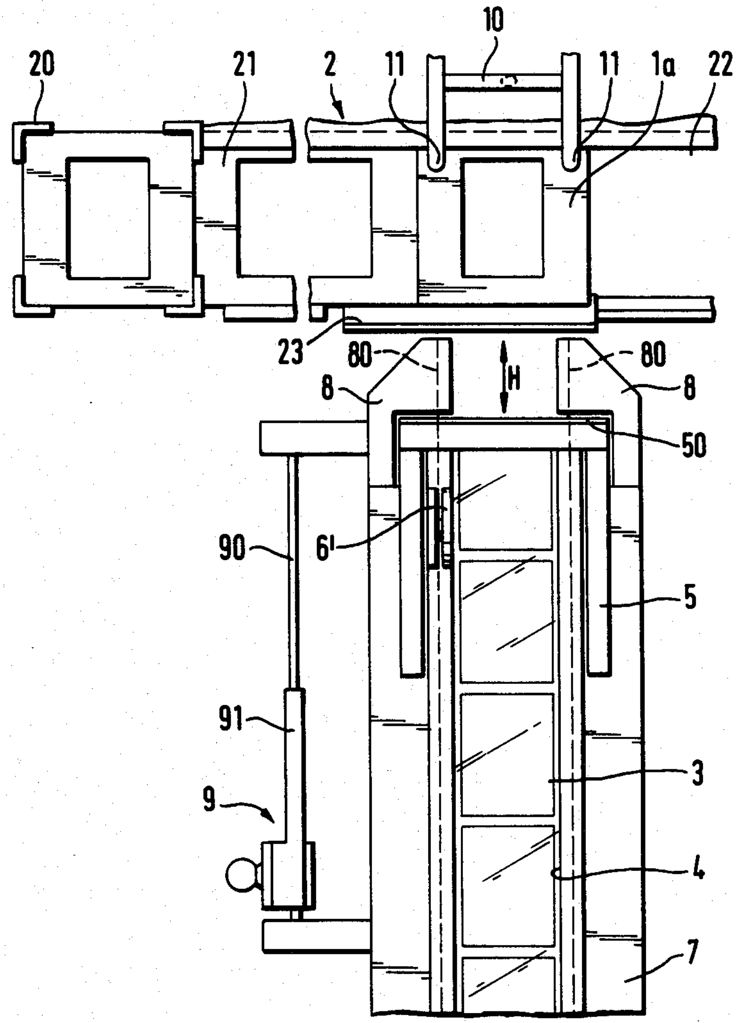
FIG. 1 is a schematic top view of part of the apparatus for mounting transparencies in transparency mounts provided for by the present invention.

As and when the last view of film 3 is mounted, the feeding mechanism shown in FIG. 1 is used, since the conveying device 6 does not move forward or does not effectively move forward the full length of said view beyond the cutting line of blade 50. Said forward movement is achieved by a pusher 9 moved across guides 4, the leading edge 91 of said pusher 9 moving against the trailing edge of said film and pushing said film forward to the final position of said film portion beyond blade 50, the auxiliary guides 8 continuing guides 4 beyond blade 50 in the direction of mount 1 and the two grooves 80 safely holding said last view in position. If no guides were provided beyond blade 50, said last view would not be held or guided adequately and it would be impossible to move the last film portion 3a into its final position in mount 1 as shown by FIG. 3. The grooves 80 provided in said auxiliary guides 8 will however hold said last view of film 3 in an appropriate position, the leading edge of said view being in its final position in mount 1.

In another embodiment of the present invention, appropriate grippers may be incorporated in guides 4 to replace the roller having projections 6 and roller 6', said grippers moving film 3 forward, as skid 7 is moved forward in the direction of arrow A. The actuating means provided for the actuation of the plunger members 11 represented by rod 12 in the embodiment of the invention illustrated by the drawings is preferably synchronized or coupled with the drive mechanism of skid 7 and/or the drive mechanism of the conveying device 6 so that the plunger members 11 will be automatically pushed down on the upper part 1a of mount 1, as skid 7 and mount holding device 2 are closest (see FIG. 3) to fix film portion 3a in its final position then reached. Said plunger members 11 are only released when all components connected with skid 7 have been removed from the opening between the upper part 1a and the lower part 1b of mount 1. The bar 23 holding the upper part 1a of mount 1 embodied by an angle bar in the embodiment of the present invention described by means of the illustrations may be of a different design provided that the cutting means 5 and the auxiliary guides 8 may enter the opening between the upper part 1a and the lower part 1b of mount 1 without restriction. In another embodiment of the present invention, the mount holding device 2 and the fixing device 10 are arranged on a mobile skid, the base of components 4, 5, 6 and 8 being stationary. In yet another embodiment, skid 7 is moved perpendicular to film 3 parallel to mount track 21, the upper part 1a of a split frame mount 1 being preferably lowered entirely on the lower part 1b of said mount, as the front film portion 3a is being inserted between said upper part and said lower part and being pushed down at its circumference e.g. by plunger members 11 for fixing the film in its final position.

We claim:

1. A method of mounting transparency film in transparency mounts comprising the following steps:

(a) presenting a transparency mount consisting of two frame parts, said frame parts consisting of an upper portion and a lower portion, said two frame parts put together at a first end and kept open at a second end opposite the first end for loading a portion of film to be mounted;

(b) inserting a leading end portion of a transparency film into the open second end of said mount until the leading end of the film portion to be mounted has reached a final position adjacent said first end of the mount;

(c) fixing the leading end of the film portion in said final position in the mount by forcing the two frame parts together into a partially closed position;

(d) introducing a cutting device into the open second end of said mount adjacent to and between said two frame parts and cutting said film portion to be mounted from the film along a cutting line located inside said mount;

(e) removing said cutting device from said open second end of mount with the cut film portion firmly held in said final position in said mount; and (f) closing said mount thereby retaining said cut portion in said final position.

2. The method according to claim 1 wherein the film portion to be mounted is guided at a minimum distance from the lower portion beyond said cutting line as said film portion is being inserted into said mount and cut therein.

3. The method according to claim 1 wherein said film is being fed continuously in a longitudinal direction of travel into a stationary split-frame mount or a mount consisting of two frame parts kept open so as to form a mouth-like opening until the film has reached a predetermined final position and wherein the two frame parts of said mount are thereafter pushed together at an end opposite the mouth-like opening for fixing the film portion to be mounted, and after said film portion is fixed the remainder of the film is retracted from said open mount together with said cutting device in a direction opposite the longitudinal feeding direction, the fixed film portion being held in place in a predetermined final position in said mount.

4. The method according to claim 2 wherein the film portion of said film is being pushed into said mount at a trailing edge and held by guides beyond said cutting line.

5. A method of mounting transparencies in transparency mounts comprising the steps of:

presenting a transparency mount comprising two frame parts, said frame parts having a first closed end and a second open end for loading a portion of film to be mounted;

inserting said film portion into said open second end until a leading end of said film portion to be mounted has reached a final position adjacent the first closed end;

fixing said leading end between adjacent portions of said two frame parts thereby fixing said leading end in said final position adjacent said first closed end of said mount, while keeping said second end of said mount open;

introducing a cutting device into said open second end of said mount and cutting said portion to be mounted from the film along a cutting line inside said open ended mount;

removing said cutting device from said open second end while the leading end of said cut film portion is firmly held in said final position in said mount; and closing said second end, of said mount while holding said cut film portion in said final position.

6. The method according to claim 5 wherein said inserting step further comprises feeding said film portion to be mounted in a longitudinal direction into said open second end of said mount while the two frame parts are kept open like a mouth, and wherein said introducing step further comprises introducing the cutting device into said open second end of said mount in a direction parallel to said longitudinal direction before cutting the film portion to be mounted and wherein said removing step further comprises retracting said cutting device in a direction opposite the feeding direction.

7. The method according to claim 6 further comprising the steps of providing guide means for reciprocal movement relative to said mount, moving said guide means into said open second end of said mount in said feeding direction to a position beyond said cutting line, said guide means guiding said film portion beyond said cutting line when said film portion is inserted in said mount, and withdrawing said guide means along with said cutting means out of the opened mount in said direction opposite the feeding direction while firmly holding the leading end of said portion in said final position in the mount.

8. The method according to claim 7 further comprising the step of providing pushing means adapted to be applied to a trailing edge of said film for pushing said film portion into said open second end of the mount, said pushed film portion being guided by said reciprocal guide means beyond said cutting line in said mount.

9. The method according to claim 5 further comprising the steps of holding a first frame part stationary in a plane, placing one edge of the second frame part in contact with one edge portion of said stationary first frame part and holding an edge of said second frame part opposite said contacting edge spaced apart from said stationary first frame part so as to define said open second end of said mount and wherein said fixing step further comprises pushing a portion of said second frame part towards said stationary first frame part while keeping the opposite portion of said second frame part spaced apart from said first frame part, thereby bending a portion of said second frame part.

10. The method according to claim 9 wherein said closing step further comprises releasing said edge of said second frame part opposite said contacting edge thereby permitting the bent portion of said second frame part to approach said stationary first frame part, and finally urging together said two frame parts to hold said portion of film in between said two frame parts.

* * * * *